(12) United States Patent
Ha

(10) Patent No.: US 12,363,271 B2
(45) Date of Patent: Jul. 15, 2025

(54) METHOD OF EVALUATING CROSSTALK AND CROSSTALK EVALUATION DEVICE PERFORMING THE SAME

(71) Applicant: Samsung Display Co., LTD., Yongin-si (KR)

(72) Inventor: Youngsang Ha, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 105 days.

(21) Appl. No.: 18/484,532

(22) Filed: Oct. 11, 2023

(65) Prior Publication Data

US 2024/0205382 A1 Jun. 20, 2024

(30) Foreign Application Priority Data

Dec. 20, 2022 (KR) ........................ 10-2022-0179781

(51) Int. Cl.
*H04N 13/327* (2018.01)
*G06T 7/00* (2017.01)
*H04N 13/302* (2018.01)
*H04N 13/398* (2018.01)

(52) U.S. Cl.
CPC ......... *H04N 13/327* (2018.05); *G06T 7/0002* (2013.01); *H04N 13/302* (2018.05); *H04N 13/398* (2018.05); *G06T 2200/04* (2013.01); *G06T 2207/20081* (2013.01); *G06T 2207/20084* (2013.01)

(58) Field of Classification Search
CPC .. H04N 13/327; H04N 13/302; H04N 13/398; H04N 13/305; H04N 13/31; H04N 13/351; H04N 13/204; H04N 13/30; H04N 17/004; G06T 7/0002; G06T 2200/04; G06T 2207/20081; G06T 2207/20084; G06V 10/993; G06V 10/765; G06V 10/82; G06V 10/88; G06N 3/08; G09G 3/006
USPC .......................................................... 348/51
See application file for complete search history.

(56) References Cited

U.S. PATENT DOCUMENTS

| 6,344,926 | B1 * | 2/2002 | Arimoto | H04N 13/363 |
| | | | | 348/E13.058 |
| 6,618,076 | B1 * | 9/2003 | Sukthankar | H04N 17/04 |
| | | | | 348/E17.005 |
| 8,240,854 | B2 * | 8/2012 | Krijn | G02B 30/27 |
| | | | | 353/8 |

(Continued)

FOREIGN PATENT DOCUMENTS

| KR | 10-1350641 | 1/2014 |
| KR | 10-2015-0074452 | 7/2015 |
| KR | 10-1925459 | 12/2018 |

*Primary Examiner* — Tung T Vo
(74) *Attorney, Agent, or Firm* — KILE PARK REED & HOUTTEMAN PLLC

(57) ABSTRACT

A method of evaluating crosstalk includes receiving a first multi-view 3-dimensional image, a second multi-view 3-dimensional image, and a third multi-view 3-dimensional image, performing a deep learning on a crosstalk evaluation for classifying the first multi-view 3-dimensional image into a normal image or a defective image to generate a learning model, and inputting the third multi-view 3-dimensional image different from the first multi-view 3-dimensional image into the learning model to perform the crosstalk evaluation of the third multi-view 3-dimensional image.

18 Claims, 8 Drawing Sheets

(56) References Cited

U.S. PATENT DOCUMENTS

| | | | |
|---|---|---|---|
| 8,390,677 B1* | 3/2013 | Said | H04N 13/305 348/51 |
| 8,500,288 B2* | 8/2013 | Murata | G03B 21/10 353/121 |
| 10,789,762 B2* | 9/2020 | Nam | G06T 7/74 |
| 11,223,808 B1* | 1/2022 | Faragher | H04N 9/3182 |
| 11,721,254 B1* | 8/2023 | Zhang | G09G 3/006 345/690 |
| D1,059,235 S * | 1/2025 | Li | D12/192 |
| 2006/0119800 A1* | 6/2006 | Burnett | H04N 5/74 353/69 |
| 2008/0129894 A1* | 6/2008 | Kang | H04N 9/3147 348/758 |
| 2010/0033680 A1* | 2/2010 | Krijn | H04N 13/398 353/8 |
| 2012/0113153 A1* | 5/2012 | Casner | H04N 13/32 345/690 |
| 2012/0299907 A1* | 11/2012 | Kim | G09G 3/3413 345/589 |
| 2013/0321493 A1* | 12/2013 | Sone | H04N 13/106 345/89 |
| 2013/0321596 A1* | 12/2013 | Li | H04N 13/125 348/51 |
| 2014/0036046 A1* | 2/2014 | Hasegawa | H04N 13/31 348/54 |
| 2014/0071120 A1* | 3/2014 | Lee | H04N 13/341 345/419 |
| 2014/0091991 A1* | 4/2014 | An | H04N 13/305 345/32 |
| 2014/0160383 A1* | 6/2014 | Shikii | G02B 26/0841 349/1 |
| 2014/0160469 A1* | 6/2014 | Huang | H04N 13/327 356/213 |
| 2014/0192170 A1* | 7/2014 | Samadani | H04N 13/111 348/51 |
| 2014/0347453 A1* | 11/2014 | Tanaka | G09G 3/36 348/54 |
| 2015/0029317 A1* | 1/2015 | Kim | H04N 13/383 348/59 |
| 2015/0092026 A1* | 4/2015 | Baik | H04N 13/373 348/54 |
| 2015/0201188 A1* | 7/2015 | Pritch | H04N 13/327 348/189 |
| 2016/0277728 A1* | 9/2016 | Guido | H04N 13/366 |
| 2017/0111633 A1* | 4/2017 | Kang | H04N 13/317 |
| 2020/0357353 A1* | 11/2020 | Lee | G09G 3/3688 |
| 2021/0343252 A1* | 11/2021 | Lu | G09G 3/3406 |
| 2022/0109815 A1* | 4/2022 | Kang | H04N 13/324 |
| 2022/0166965 A1* | 5/2022 | Chu | H04N 13/324 |
| 2022/0187618 A1* | 6/2022 | Kusafuka | G02B 27/0101 |
| 2022/0210397 A1* | 6/2022 | Kim | G02B 30/27 |
| 2023/0070798 A1* | 3/2023 | Miyatani | G06F 21/6245 |
| 2023/0188700 A1* | 6/2023 | Zhu | H04N 13/351 348/51 |
| 2023/0292016 A1* | 9/2023 | Zhu | H04N 13/232 |
| 2024/0015277 A1* | 1/2024 | Min | H04N 13/302 |
| 2024/0212973 A1* | 6/2024 | Sakai | G06T 5/94 |
| 2024/0223747 A1* | 7/2024 | Ma | H04N 13/305 |
| 2024/0282254 A1* | 8/2024 | Lee | G09G 3/2003 |

* cited by examiner

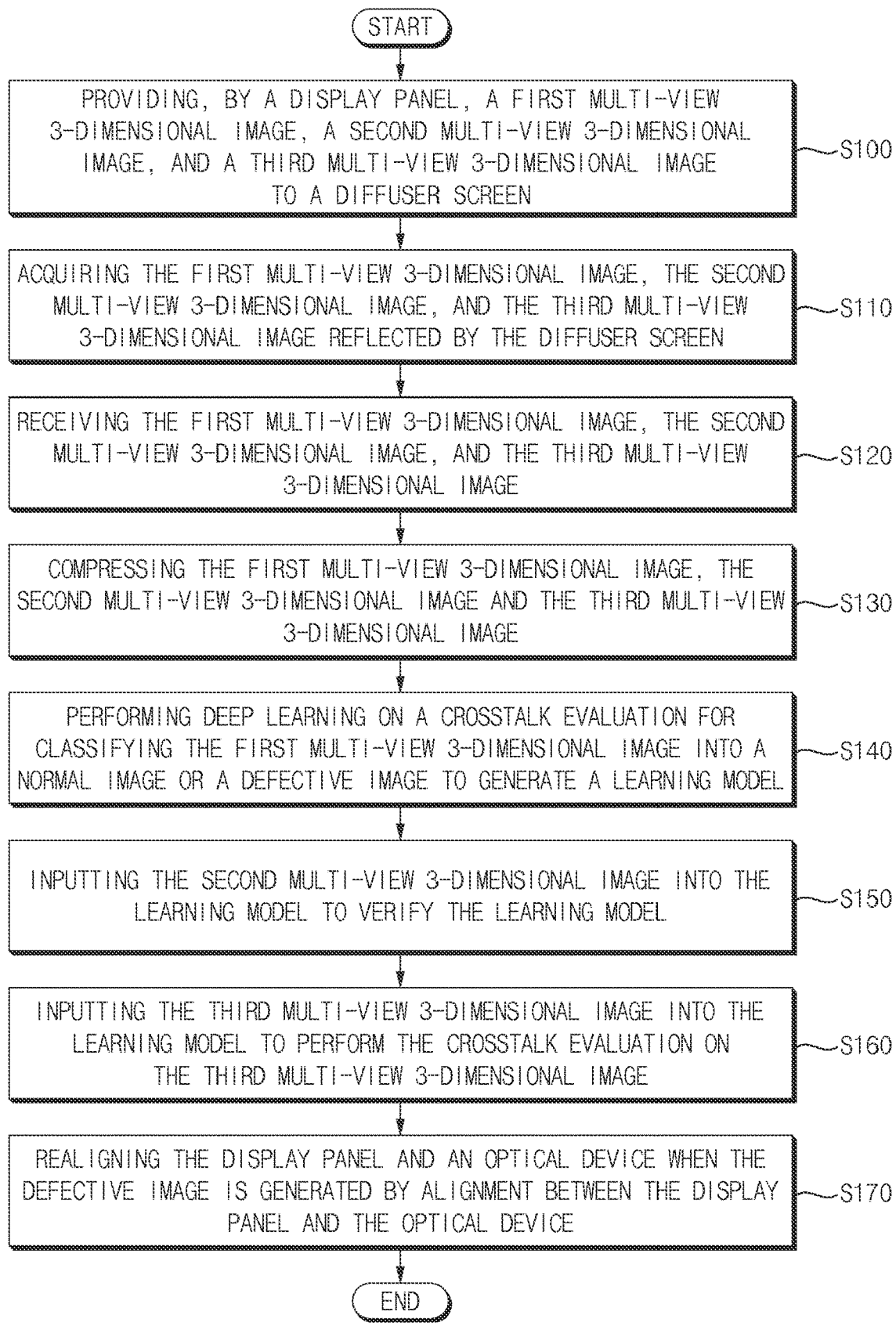

FIG. 6

| Classification | Total quantity | Ratio | | |
|---|---|---|---|---|
| | | Train(0.7) | Verification(0.2) | Test(0.1) |
| OK | 1615 | 367 | 106 | 52 |
| NGDA | 525 | 193 | 55 | 28 |
| NGBN | 276 | 329 | 94 | 47 |
| NGSP | 470 | 175 | 50 | 25 |
| NGCU | 250 | 65 | 19 | 10 |
| | 94 | | | |

METHOD OF EVALUATING CROSSTALK AND CROSSTALK EVALUATION DEVICE PERFORMING THE SAME

This application claims priority to and benefits of Korean Patent Application No. 10-2022-0179781 under 35 USC § 119, filed on Dec. 20, 2022, in the Korean Intellectual Property Office (KIPO), the entire contents of which are incorporated herein by reference.

BACKGROUND

1. Technical Field

Embodiments of the disclosure relate to a method of evaluating crosstalk and a crosstalk evaluation device performing the same through a deep learning.

2. Description of the Related Art

A currently commercialized 3-dimensional display device uses a principle of providing a sense of depth by providing different images to a user's two eyes. However, this method only provides binocular parallax information to the user, but fails to provide monocular depth perception factors such as focus control and motion parallax. Therefore, a 3-dimensional image is not natural, and eye fatigue may be generated.

As a technology for displaying a natural 3-dimensional image without fatigue, there are 3-dimensional display technologies for reproducing a spatial angular distribution of light rays, that is, a light field. The light field refers to a distribution of the light rays coming from an object by position or by direction. Optically reproducing the light field on an arbitrary plane may allow the user positioned behind the arbitrary plane to see the natural 3-dimensional image of the object, and the user can experience a same light distribution as if there is a real object.

Quality of the 3-dimensional image may be evaluated by contrast, flicker, crosstalk, and the like. The crosstalk may mean a phenomenon in which a left eye image is mixed with a right eye image and displayed to a right eye, or, conversely, the right eye image is mixed with the left eye image and displayed to a left eye.

Meanwhile, a conventional method of evaluating crosstalk may calculate crosstalk values for each of viewpoints of a multi-view 3-dimensional image through a calculation formula, and may classify the multi-view 3-dimensional image into a normal image or a defective image based on the crosstalk values. Since the conventional method of evaluating crosstalk calculates the crosstalk values for each of the viewpoints of the multi-view 3-dimensional image, the conventional method of evaluating crosstalk may take a long time and an accuracy of crosstalk evaluation may be reduced.

SUMMARY

Embodiments of the disclosure provide a method of evaluating crosstalk capable of minimizing crosstalk evaluation time by performing a deep learning on a crosstalk evaluation.

Embodiments of the disclosure provide a crosstalk evaluation device capable of minimizing crosstalk evaluation time by performing a deep learning on a crosstalk evaluation.

In an embodiment of the disclosure, a method of evaluating crosstalk may include receiving a first multi-view 3-dimensional image, a second multi-view 3-dimensional image, and a third multi-view 3-dimensional image, performing a deep learning on a crosstalk evaluation for classifying the first multi-view 3-dimensional image into a normal image or a defective image to generate a learning model, and inputting the third multi-view 3-dimensional image different from the first multi-view 3-dimensional image into the learning model to perform the crosstalk evaluation of the third multi-view 3-dimensional image.

In an embodiment, the method may further include inputting the second multi-view 3-dimensional image different from the first multi-view 3-dimensional image and the third multi-view 3-dimensional image into the learning model to verify the learning model.

In an embodiment, the method may further include providing, by a display panel, the first multi-view 3-dimensional image, the second multi-view 3-dimensional image, and the third multi-view 3-dimensional image to a diffuser screen, and acquiring the first multi-view 3-dimensional image, the second multi-view 3-dimensional image, and the third multi-view 3-dimensional image reflected by the diffuser screen.

In an embodiment, the first multi-view 3-dimensional image, the second multi-view 3-dimensional image, and the third multi-view 3-dimensional image provided by the display panel may be controlled by an optical device, and the optical device may be a lenticular lens or a parallax barrier.

In an embodiment, the defective image may be generated by misalignment between the display panel and the optical device.

In an embodiment, the defective image may include at least one of a low brightness image, a background noise image, a spreading image, and a curved image.

In an embodiment, the method may further include realigning the display panel and the optical device in case that the defective image is generated by misalignment between the display panel and the optical device.

In an embodiment, the method may further include compressing the first multi-view 3-dimensional image, the second multi-view 3-dimensional image, and the third multi-view 3-dimensional image such that resolutions of the first multi-view 3-dimensional image, the second multi-view 3-dimensional image, and third multi-view 3-dimensional image are resized from a first resolution to a second resolution lower than the first resolution.

In an embodiment of the disclosure, a method of evaluating crosstalk may include receiving a first multi-view 3-dimensional image, a second multi-view 3-dimensional image, and a third multi-view 3-dimensional image, extracting a grayscale of the first multi-view 3-dimensional image, performing a deep learning on a crosstalk evaluation for classifying the first multi-view 3-dimensional image into a normal image or a defective image to generate a learning model, and inputting the third multi-view 3-dimensional image different from the first multi-view 3-dimensional image into the learning model to perform the crosstalk evaluation of the third multi-view 3-dimensional image.

In an embodiment, the method may further include inputting the second multi-view 3-dimensional image different from the first multi-view 3-dimensional image and the third multi-view 3-dimensional image into the learning model to verify the learning model.

In an embodiment, the method may further include providing, by a display panel, the first multi-view 3-dimensional image, the second multi-view 3-dimensional image, and the third multi-view 3-dimensional image to a diffuser screen, and acquiring the first multi-view 3-dimensional image, the second multi-view 3-dimensional image, and the third multi-view 3-dimensional image reflected by the diffuser screen.

In an embodiment, the first multi-view 3-dimensional image, the second multi-view 3-dimensional image, and the third multi-view 3-dimensional image provided by the display panel may be controlled by an optical device, and the optical device may be a lenticular lens or a parallax barrier.

In an embodiment, the defective image may be generated by misalignment between the display panel and the optical device.

In an embodiment, the defective image may include at least one of a low brightness image, a background noise image, a spreading image, and a curved image.

In an embodiment, the method may further include realigning the display panel and the optical device in case that the defective image is generated by misalignment between the display panel and the optical device.

In an embodiment, the method may further include, compressing the first multi-view 3-dimensional image, the second multi-view 3-dimensional image, and the third multi-view 3-dimensional image such that resolutions of the first multi-view 3-dimensional image, the second multi-view 3-dimensional image and the third multi-view 3-dimensional image are resized from a first resolution to a second resolution lower than the first resolution.

In an embodiment of the disclosure, a crosstalk evaluation device may include a display panel, a diffuser screen that reflects a first multi-view 3-dimensional image, a second multi-view 3-dimensional image, and a third multi-view 3-dimensional image provided by the display panel, a digital camera that acquires the first multi-view 3-dimensional image, the second multi-view 3-dimensional image, and the third multi-view 3-dimensional image reflected by the diffuser screen, and a crosstalk evaluator that receives the first multi-view 3-dimensional image, the second multi-view 3-dimensional image, and the third multi-view 3-dimensional image, performs a deep learning on a crosstalk evaluation for classifying the first multi-view 3-dimensional image into a normal image or a defective image to generate a learning model, and inputs the third multi-view 3-dimensional image different from the first multi-view 3-dimensional image into the learning model to perform the crosstalk evaluation of the third multi-view 3-dimensional image.

In an embodiment, the first multi-view 3-dimensional image, the second multi-view 3-dimensional image, and the third multi-view 3-dimensional image provided by the display panel may be controlled by an optical device, and the optical device may be a lenticular lens or a parallax barrier.

In an embodiment, the defective image may be generated by misalignment between the display panel and the optical device.

In an embodiment, the defective image may include at least one of a low brightness image, a background noise image, a spreading image, and a curved image.

According to an embodiment of the method of evaluating the crosstalk and the crosstalk evaluation device performing the same, the method and the crosstalk evaluation device may perform a deep learning on a crosstalk evaluation for classifying multi-view 3-dimensional image into a normal image or a defective image to generate a learning model and may perform the crosstalk evaluation of the multi-view 3-dimensional image so that crosstalk evaluation time is minimized.

BRIEF DESCRIPTION OF THE DRAWINGS

The above and other features of embodiments of the disclosure will become more apparent by describing in detailed embodiments thereof with reference to the accompanying drawings, in which:

FIG. 1 is a flowchart for illustrating an embodiment of a method of evaluating crosstalk through a deep learning;

FIG. 6 is a table for illustrating a deep learning;

DETAILED DESCRIPTION OF THE EMBODIMENTS

Figure 2A:
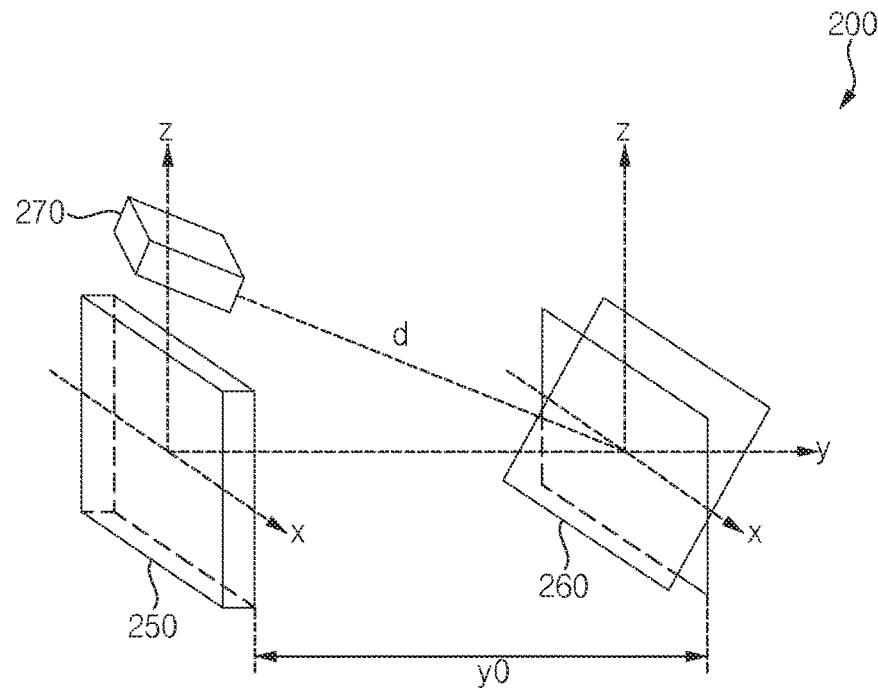
FIG. 2A is a schematic diagram for illustrating a crosstalk evaluation device.

A currently commercialized 3-dimensional display device uses a principle of providing a sense of depth by providing different images to a user's two eyes. However, this method only provides binocular parallax information to the user, but fails to provide monocular depth perception factors such as focus control and motion parallax. Therefore, a 3-dimensional image is not natural, and eye fatigue may be generated.

As a technology for displaying a natural 3-dimensional image without fatigue, there are 3-dimensional display technologies for reproducing a spatial angular distribution of light rays, for example, a light field. The light field refers to a distribution of the light rays coming from an object by position or by direction. Optically reproducing the light field on an arbitrary plane may allow the user positioned behind the arbitrary plane to see the natural 3-dimensional image of the object, and the user may experience a same light distribution as if there is a real object.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment. Also, like reference numerals and/or reference characters denote like elements.

Unless otherwise specified, the illustrated embodiments are to be understood as providing exemplary features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Hereinafter, embodiments of the disclosure will be described in detail with reference to the accompanying drawings.

Figure 2B:
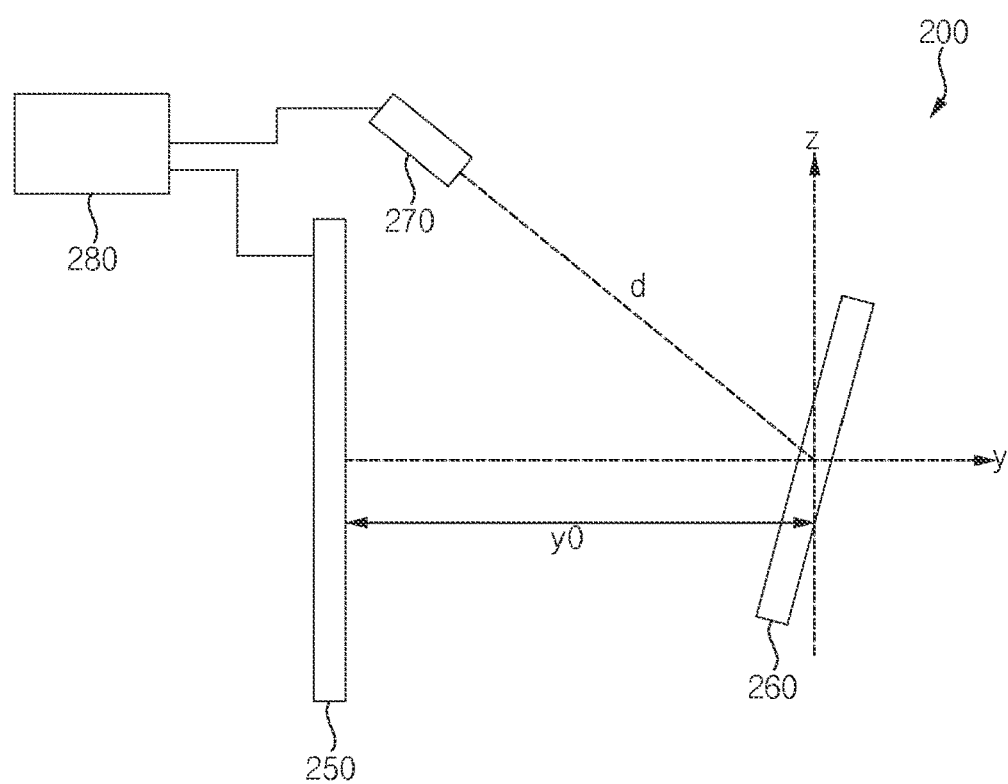
FIG. 2B is a schematic cross-sectional view of FIG. 2A taken along yz plane of FIG. 2A.

FIG. 1 is a flowchart for illustrating an embodiment of a crosstalk evaluation method through a deep learning. FIG. 2A is a schematic diagram for illustrating a crosstalk evaluation device 200. FIG. 2B is a schematic cross-sectional view of FIG. 2A taken along yz plane of FIG. 2A.

Referring to FIGS. 1 to 2B, in a method of evaluating crosstalk according to an embodiment of the disclosure, a display panel 250 may provide a first multi-view 3-dimensional image, a second multi-view 3-dimensional image, and a third multi-view 3-dimensional image to a diffuser screen 260 (step S100).

A crosstalk evaluation device 200 may include the display panel 250, an optical device 255, the diffuser screen 260, a digital camera 270, and a crosstalk evaluator 280.

The display panel 250 may generate a first multi-view 3-dimensional image, a second multi-view 3-dimensional image, and a third multi-view 3-dimensional image. Each of the first multi-view 3-dimensional image, the second multi-view 3-dimensional image, and the third multi-view 3-dimensional image may be a set of images generated from multiple views of the display panel 250. For example, each of the first multi-view 3-dimensional image, the second multi-view 3-dimensional image, and the third multi-view 3-dimensional image may include images of first to N-th view (N is a natural number of 1 or greater). The multi-view image may include the first multi-view 3-dimensional image, the second multi-view 3-dimensional image, and the third multi-view 3-dimensional image.

The first multi-view 3-dimensional image may be a multi-view 3-dimensional image used to perform a deep learning on a crosstalk evaluation to generate a learning model. The second multi-view 3-dimensional image may be a multi-view 3-dimensional image to be input to the generated learning model to verify the learning model. The third multi-view 3-dimensional image may be a multi-view 3-dimensional image to be input to the verified learning model to perform the crosstalk evaluation. The first multi-view 3-dimensional image, the second multi-view 3-dimensional image, and the third multi-view 3-dimensional image may be different from each other. For example, the multi-view 3-dimensional image provided by the display panel 250 may include a resolution of 3680×2456. However, the disclosure is not limited thereto.

Figure 3:
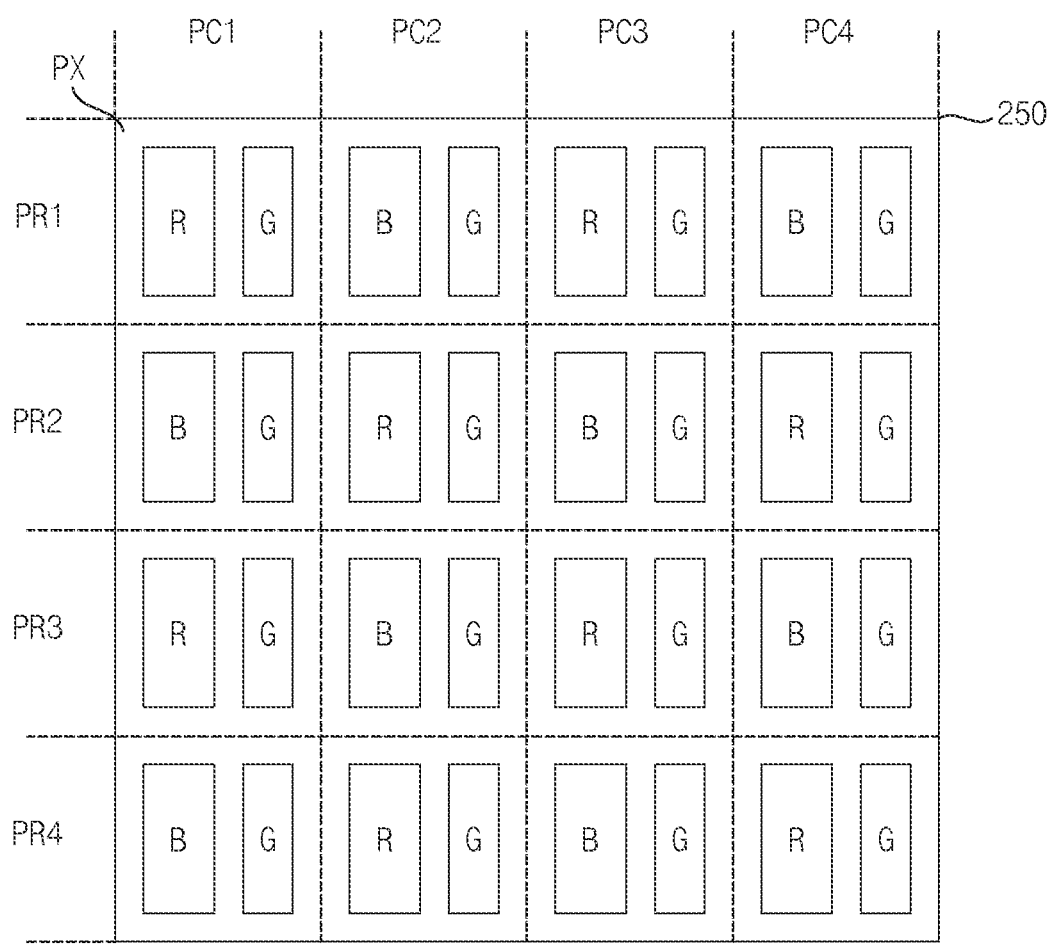
FIG. 3 is a schematic diagram for illustrating an embodiment of a display panel included in the crosstalk evaluation device of FIG. 2A.

FIG. 3 is a schematic diagram for illustrating an embodiment of a display panel 250 included in the crosstalk evaluation device 200 of FIG. 2A.

FIGS. 1 to 3, the display panel 250 may be a PenTile® RGBG display panel 250 having an RGBG pixel structure. Each pixel of the display panel 250 may include subpixels of two different colors. For example, each pixel of the display panel 250 may include an R subpixel and a G subpixel, or a B subpixel and the G subpixel.

In the PenTile® display panel 250, each pixel PX may include a rectangular R subpixel and a rectangular G subpixel smaller than the rectangular R subpixel, or a rectangular B subpixel and the rectangular G subpixel smaller than the rectangular B subpixel. In odd-numbered pixel rows PR1 and PR3 of the PenTile® display panel 250, the R subpixel, the G subpixel, the B subpixel, and the G subpixels may be sequentially arranged, and in even-numbered pixel rows PR2 and PR4 of the PenTile® display panel 250, the B subpixel, the G subpixel, the R subpixel, and the G subpixel may be sequentially arranged. In odd-numbered pixel columns PC1 and PC3 of the PenTile® display panel 250, the R subpixel, the G subpixel, the B subpixel, and the G subpixel may be sequentially arranged, and in even-numbered pixel columns PC2 and PC4 of the PenTile® display panel 250, the B subpixel, the G subpixel, the R subpixel, and the G subpixel may be sequentially arranged. However, the disclosure is not limited thereto, and in an embodiment, the display panel 250 may be a PenTile® RGBW display panel, a Diamond PenTile® display panel, an S-Stripe display panel, or the like.

Figure 4A:
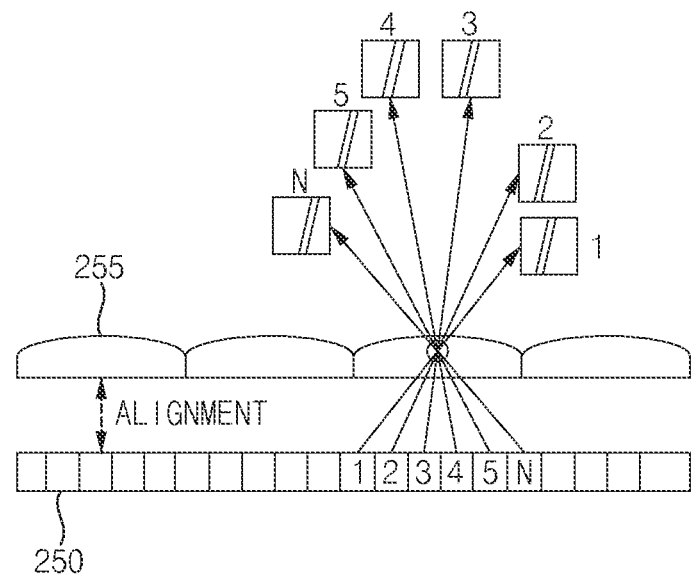
FIG. 4A is a schematic diagram for illustrating an embodiment of an optical device included in the crosstalk evaluation device of FIG. 2A.
Figure 4B:
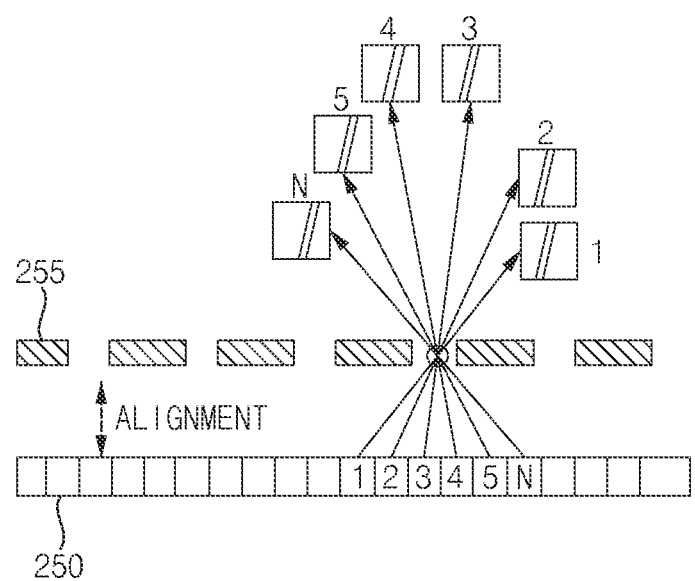
FIG. 4B is a schematic diagram for illustrating an embodiment of an optical device included in the crosstalk evaluation device of FIG. 2A.
Figure 5A:
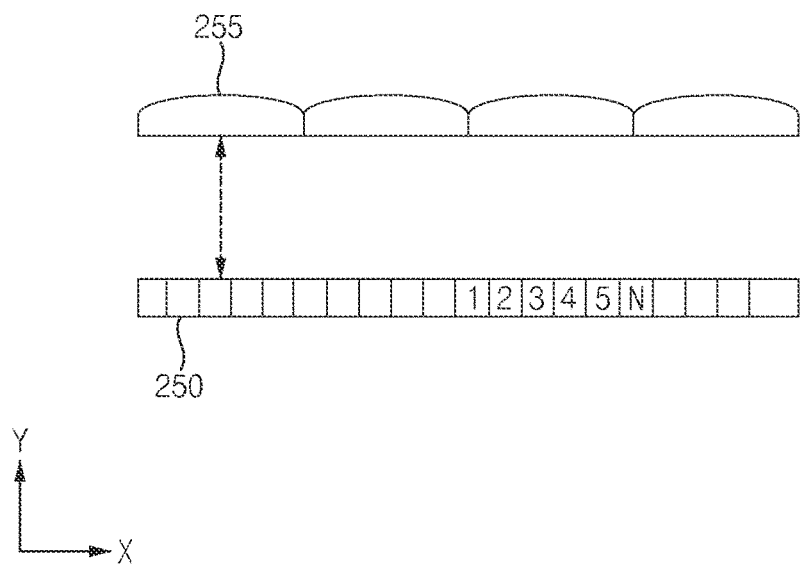
FIG. 5A is a schematic diagram for illustrating an embodiment in which a defective image is generated by misalignment of an optical device.
Figure 5B:
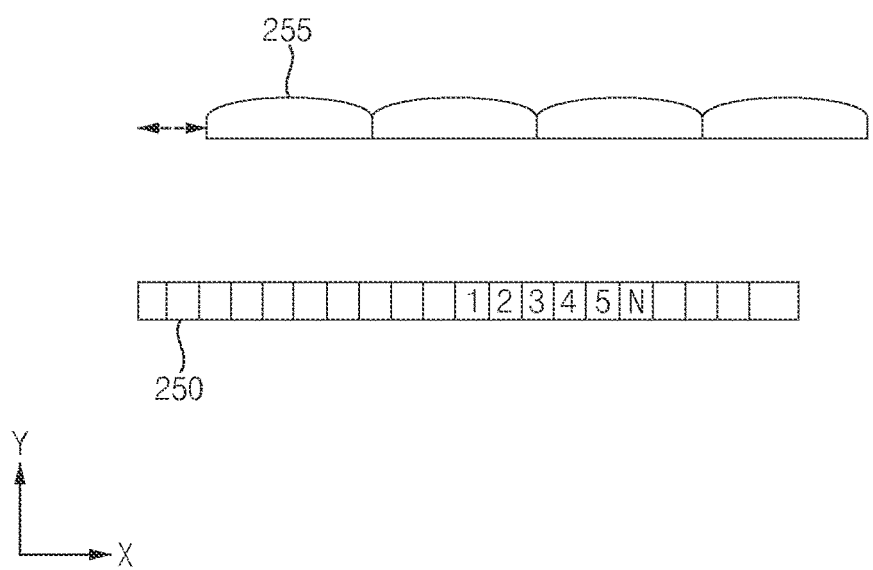
FIG. 5B is a schematic diagram for illustrating an embodiment in which a defective image is generated by misalignment of an optical device.

FIG. 4A is a schematic diagram for illustrating an embodiment of an optical device 255 included in the crosstalk evaluation device 200 of FIG. 2A. FIG. 4B is a schematic diagram for illustrating an embodiment of an optical device 255 included in the crosstalk evaluation device 200 of FIG. 2A. FIG. 5A is a schematic diagram for illustrating an embodiment in which a defective image is generated by misalignment of an optical device 255. FIG. 5B is a schematic diagram for illustrating an embodiment in which a defective image is generated by misalignment of an optical device 255.

Referring to FIGS. 1 to 5B, the multi-view 3-dimensional image provided by the display panel 250 may be controlled by the optical device 255. The optical device 255 may control directions of the light rays emitted from the subpixels of the display panel 250. In an embodiment, the optical device 255 may be a lenticular lens as shown in FIG. 4A. The multi-view 3-dimensional image may be displayed by controlling the direction of the light rays emitted from the subpixels of the display panel 250 by the lenticular lens. In an embodiment, the optical device 255 may be a parallax barrier as shown in FIG. 4B. The direction of the light rays emitted from the subpixels of the display panel 250 may be controlled by the parallax barrier 260b so that the multi-view 3-dimensional image may be displayed. In an embodiment, the optical device 255 may be a lens array, micro lens array, or the like, but is not limited thereto.

The diffuser screen 260 may be disposed at the user's location. As shown in FIG. 2A, the light diffuser screen 260 may be disposed apart from a plane on which the display panel 250 is disposed by a distance y0 in a direction y perpendicular to the plane. The diffuser screen 260 may be rotated by an angle with respect to y-axis. The diffuser screen 260 may reflect the multi-view 3-dimensional image provided by the display panel 250.

The digital camera 270 may acquire the first multi-view 3-dimensional image, the second multi-view 3-dimensional image, and the third multi-view 3-dimensional image reflected by the diffuser screen 260 (step S110).

The digital camera 270 may be disposed apart from the diffuser screen 260 by a distance d. The digital camera 270 may acquire the multi-view 3-dimensional images reflected by the diffuser screen 260. The digital camera 270 may be a color digital camera or a black and white digital camera.

The crosstalk evaluator 280 may receive the first multi-view 3-dimensional image, the second multi-view 3-dimensional image, and the third multi-view 3-dimensional image from the digital camera 270 (step S120).

Quality of the 3-dimensional image may be evaluated by contrast, flicker, crosstalk, and the like. The crosstalk may be a phenomenon in which a left eye image is mixed with a right eye image and displayed to a right eye, or, conversely, the right eye image is mixed with the left eye image and displayed to a left eye.

A conventional method of evaluating crosstalk may calculate crosstalk values for each of multiple viewpoints of a multi-view 3-dimensional image through a calculation formula, and may classify the multi-view 3-dimensional image into a normal image OK or a defective image NG based on the crosstalk values. Since the conventional method of evaluating crosstalk calculates the crosstalk values for each of the viewpoints of the multi-view 3-dimensional image, the conventional method of evaluating crosstalk may take a long time and an accuracy of the crosstalk evaluation may be reduced.

The normal image OK may be a multi-view 3-dimensional image having no quality defect, and the defective image NG may be a multi-view 3-dimensional image having a quality defect. The defective image NG may be generated by misalignment of the display panel 250 and the optical device 255. The defective image NG may occur in case that the display panel 250 and the optical device 255 is misaligned, because directions of light rays emitted from the subpixels of the display panel 250 are not controlled. For example, as shown in FIG. 5A, a distance between the display panel 250 and the optical device 255 may increase or decrease in a y-axis direction of FIG. 2A (or a thickness direction of the display panel 250) and the display panel 250 and the optical device 255 may be misaligned. For example, as shown in FIG. 5B, an alignment between the display panel 250 and the optical device 255 may be off in an x-axis direction of FIG. 2A (or a direction perpendicular to the thickness direction of the display panel 25), and the display panel 250 and the optical device 255 may be misaligned.

In order to solve this problem, the crosstalk value may not be calculated for each of the views of the multi-viewpoint 3-dimensional image, and the crosstalk evaluator 280 may perform a deep learning on the crosstalk evaluation for classifying the multi-view 3-dimensional images into the normal image OK or the defective image NG to generate a learning model. For example, the crosstalk evaluator 280 may be a computer.

The crosstalk evaluator 280 may resize the first multi-view 3-dimensional image, the second multi-view 3-dimensional image, and the third multi-view 3-dimensional image (step S130). Resizing may include compressing the multi-view 3-dimensional image to a lower resolution. For example, the multi-view 3-dimensional image provided by the display panel 250 may have a resolution of 3680×2456. In case that the resolution of the multi-view 3-dimensional image provided by the display panel 250 is high, the crosstalk evaluation may take a long time. Therefore, the multi-view 3-dimensional image may be resized and compressed to the lower resolution. For example, the resolution of the first multi-view 3-dimensional image, the resolution of the second multi-view 3-dimensional image, and the resolution of the third multi-view 3-dimensional image may be reduced by about 10 times. For example, the multi-view 3-dimensional image having the resolution of 3680×2456 may be compressed to a resolution of 300×200. However, in case that the resolution of the multi-view 3-dimensional image is excessively reduced, the crosstalk evaluation method may take a short time, but the crosstalk evaluation may be less accurate.

The crosstalk evaluator 280 may perform a deep learning on the crosstalk evaluation for classifying the first multi-view 3-dimensional image into a normal image OK or a defective image NG to generate a learning model (step S140). The defective image NG may include at least one of a low brightness image NGDA, a background noise image NGBN, a spreading image NGSP, and a curved image NGCU. For example, the crosstalk evaluator 280 may perform a deep learning on the crosstalk evaluation for classifying the multi-view 3-dimensional images into a normal image OK, a low brightness image NGDA, a background noise image NGBN, a spreading image NGSP, or a curved image NGCU to generate a learning model.

The low brightness image NGDA may be a multi-view 3-dimensional image having a defect in image quality due to lower overall luminance than the normal image OK. For example, the low brightness image NGDA may be a multi-view 3-dimensional image having a defect in the image quality due to overall low luminance.

The background noise image NGBN may be a multi-view 3-dimensional image having a blurry quality defect because of a lower contrast ratio than the normal image OK. For example, the contrast ratio may be a ratio of maximum luminance to minimum luminance, and the background noise image NGBN may be the multi-view 3-dimensional image having a blurry quality defect due to a low ratio of the maximum luminance to the minimum luminance.

The spreading image NGSP may be a multi-view 3-dimensional image having a quality defect because a boundary between a maximum luminance part and a minimum luminance part is unclear compared to the normal image OK. For example, the spreading image NGSP may be a multi-view 3-dimensional image having a defect in the image quality because a ratio of an area of the maximum luminance part to an area of the minimum luminance part is greater than the normal image OK.

The curved image NGCU may be a multi-view 3-dimensional image having a defect in the image quality because a curvature of the maximum luminance part is greater than the normal image OK.

The crosstalk evaluator 280 may generate the learning model by a deep learning algorithm for performing the crosstalk evaluation. The deep learning may be a technology in which the computer learns by combining and analyzing data to form its own rules.

The deep learning algorithm may be a neural network. The neural network may be a set of algorithms which learn how to recognize an object from an image input to the neural network based on an artificial intelligence. For example, the neural network may learn how to recognize an object from the image based on a supervised learning using the image as an input value. For example, the neural network may be based on an unsupervised learning, which discovers a pattern for recognizing the object from the image by self-learning a type of the data necessary to recognize the object from the image without any guidance. For example, the neural network may learn how to recognize an object from the image through reinforcement learning using feedback about whether a result of recognizing the object according to learning is correct.

The neural network may perform a calculation for reasoning and prediction according to artificial intelligence (AI) technology. For example, the neural network may be a deep neural network (DNN) which performs an operation through multiple layers. The neural network may be classified as a deep neural network (DNN) in case that the number of layers is multiple based on the number of internal layers which perform calculations, for example, in case that a depth of the neural network which performs the calculation increases. Also, deep neural network (DNN) calculations may include a convolutional neural network (CNN) calculation and the like. For example, the crosstalk evaluator 280 may implement a data recognition model for recognizing an object by the neural network and may train the data recognition model using training data. The crosstalk evaluator 280 may analyze or classify the image which is input data by the data recognition model to analyze and classify the object included in the image.

For example, a deep learning algorithm of the disclosure may be an exception network. For example, the deep learning algorithm of the disclosure may be an inception network. However, the disclosure is not limited thereto.

FIG. 6 is a table for illustrating a deep learning.

Referring to FIGS. 1 to 6, the crosstalk evaluator 280 may train the deep learning on the crosstalk evaluation for classifying the multi-view 3-dimensional images into a normal image OK, a low brightness image NGDA, a background noise image NGBN, a spreading image NGSP, or a curved image NGCU by the deep learning algorithm to generate the learning model on the crosstalk evaluation.

For example, as shown in FIG. 6, the number of multi-view 3-dimensional images acquired by the digital camera 270 may be 1615. For example, the number of normal images OK may be 525. For example, the number of low brightness images NGDA may be 276. For example, the number of background noise images NGBN may be 470. For example, the number of spreading images NGSP may be 250. For example, the number of curved images NGCU may be 94.

For example, 367 (70%) normal images OK, 193 (70%) low brightness images NGDA, 329 (70%) background noise images NGBN, 175 (70%) spreading images NGSP, and 65 (70%) curved images NGCU may be used for a deep learning training on the crosstalk evaluation. The learning model may be generated through the deep learning training on the crosstalk evaluation.

After the learning model is generated, the crosstalk evaluator 280 may input the second multi-view 3-dimensional image to the learning model to verify the learning model (step S150).

For example, 106 (20%) normal images OK, 55 (20%) low brightness images NGDA, 94 (20%) background noise images NGBN, 50 (20%) spreading images NGSP, and 19 (20%) curved images NGCU may be used for verification of the learning model.

After the learning model is verified, the crosstalk evaluator 280 may input the third multi-view 3-dimensional image to the learning model to perform the crosstalk evaluation on the third multi-view 3-dimensional image (step S160).

For example, 52 (10%) normal images OK, 28 (10%) low brightness images NGDA, 47 (10%) background noise images NGBN, 25 (10%) spreading images NGSP, and 10 (10%) curved images NGCU may be used to perform the crosstalk evaluation.

For example, a ratio of the first multi-view 3-dimensional images, the second multi-view 3-dimensional images, and the third multi-view 3-dimensional images may be 0.7, 0.2, and 0.1. However, the disclosure is not limited thereto.

In case that the third multi-view 3-dimensional image is evaluated as a defective image NG, the display panel 250 and the optical device 255 may be realigned (S170). Since the defective image NG may be caused by misalignment of the display panel 250 and the optical device 255, the display panel 250 and the optical device 255 may be realigned.

As such, the method of evaluating the crosstalk and the crosstalk evaluation device 200 may perform a deep learning on the crosstalk evaluation for classifying the multi-view 3-dimensional image into a normal image OK or a defective image NG to generate a learning model and may perform the crosstalk evaluation on the multi-view 3-dimensional image so that crosstalk evaluation time is minimized.

Figure 7:
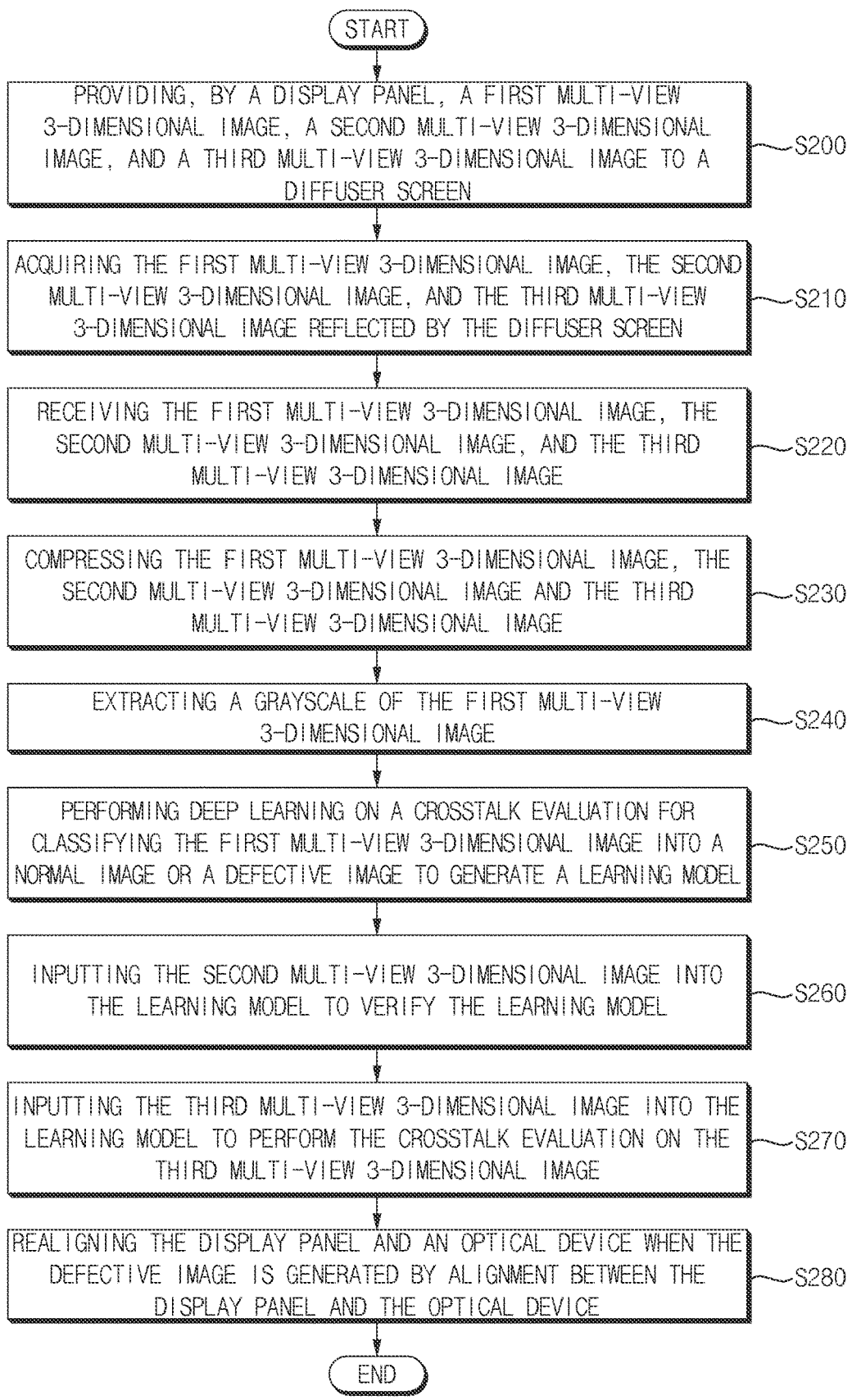
FIG. 7 is a flowchart for illustrating an embodiment of a method of evaluating crosstalk through a deep learning.
Figure 8:
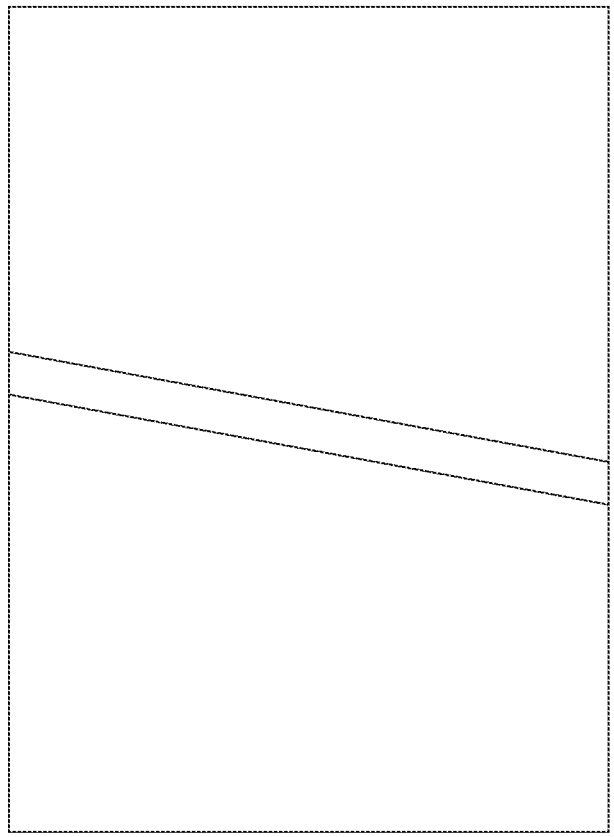
FIG. 8 is a schematic diagram for illustrating a grayscale of a first multi-view 3-dimensional image.

FIG. 7 is a flowchart for illustrating an embodiment of a method of evaluating crosstalk through a deep learning. FIG. 8 is a schematic diagram for illustrating a grayscale of a first multi-view 3-dimensional image.

Referring to FIGS. 1 to 8, in an embodiment, a display panel 250 may provide a first multi-view 3-dimensional image, a second multi-view 3-dimensional image, and a third multi-view 3-dimensional image to a diffuser screen 260 (step S200). The digital camera 270 may acquire the first multi-view 3-dimensional image, the second multi-view 3-dimensional image, and the third multi-view 3-dimensional image reflected by the diffuser screen 260 (step S210). The crosstalk evaluator 280 may receive the first multi-view 3-dimensional image, the second multi-view 3-dimensional image, and the third multi-view 3-dimensional image (step S220). The crosstalk evaluator 280 may compress the first multi-view 3-dimensional image, the second multi-view 3-dimensional image, and the third multi-view 3-dimensional image such the first multi-view 3-dimensional image, the second multi-view 3-dimensional image, and the third multi-view 3-dimensional image having a first resolution are resized to a second resolution lower than the first resolution (step S230). The crosstalk evaluator 280 may extract a grayscale of the first multi-view 3-dimensional image (step S240). The crosstalk evaluator 280 may perform a deep learning on a crosstalk evaluation for classifying the first multi-view 3-dimensional image into a normal image OK or a defective image NG to generate a learning model (step S250). After the learning model is generated, the crosstalk evaluator 280 may input the second multi-view 3-dimensional image to the learning model to verify the learning model (step S260). After the learning model is verified, the crosstalk evaluator 280 may input the third multi-view 3-dimensional image to the learning model to perform the crosstalk evaluation on the third multi-view 3-dimensional image (step S270). In case that the third multi-view 3-dimensional image is evaluated as a defective image NG, the display panel 250 and the optical device 255 may be realigned (S280).

The crosstalk evaluator 280 may extract the grayscale of the first multi-view 3-dimensional image acquired by the digital camera 270 and may perform a deep learning on the cross evaluation for classifying the first multi-view 3-dimensional image into a normal image OK or a defective image NG to generate a learning model.

For example, the grayscale of the multi-view 3-dimensional image may be in a range of 0 Gray to 255 Gray. 0 Gray may be a grayscale of minimum luminance, and 255 Gray may be a grayscale of maximum luminance. As shown in FIG. 8, the crosstalk evaluator 280 may extract grayscale of the first multi-view 3-dimensional image acquired by the digital camera 270. The crosstalk evaluator 280 may perform a deep learning on the crosstalk evaluation for classifying the first multi-view 3-dimensional image into a normal image OK or a defective image NG based on a distribution of the grayscale to generate a learning model.

In this way, the crosstalk evaluation method and the crosstalk evaluation device performing the same may perform a deep learning on the crosstalk evaluation for classifying a multi-view 3-dimensional image into a normal image (OK) or a defective image (NG) to train the learning model. Crosstalk evaluation time can be minimized by generating and performing crosstalk evaluation on multi-view 3-dimensional images.

As such, the method of evaluating the crosstalk and the crosstalk evaluation device 200 may perform the deep learning on the crosstalk evaluation for classifying the multi-view 3-dimensional image into a normal image OK or a defective image NG to generate a learning model and may perform the crosstalk evaluation on the multi-view 3-dimensional image so that crosstalk evaluation time is minimized.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A method of evaluating crosstalk, the method comprising:
   providing, by a display panel, a first multi-view 3-dimensional image, a second multi-view 3-dimensional image, and a third multi-view 3-dimensional image to a diffuser screen;
   acquiring the first multi-view 3-dimensional image, the second multi-view 3-dimensional image, and the third multi-view 3-dimensional image reflected by the diffuser screen;
   receiving the first multi-view 3-dimensional image, the second multi-view 3-dimensional image, and the third multi-view 3-dimensional image;
   performing a deep learning on a crosstalk evaluation for classifying the first multi-view 3-dimensional image into a normal image or a defective image to generate a learning model; and
   inputting the third multi-view 3-dimensional image different from the first multi-view 3-dimensional image into the learning model to perform the crosstalk evaluation of the third multi-view 3-dimensional image.

2. The method of claim 1, further comprising: inputting the second multi-view 3-dimensional image different from the first multi-view 3-dimensional image and the third multi-view 3-dimensional image into the learning model to verify the learning model.

3. The method of claim 1, wherein the first multi-view 3-dimensional image, the second multi-view 3-dimensional image, and the third multi-view 3-dimensional image provided by the display panel are controlled by an optical device, and the optical device is a lenticular lens or a parallax barrier.

4. The method of claim 3, wherein the defective image is generated by misalignment between the display panel and the optical device.

5. The method of claim 1, wherein the defective image includes at least one of a low brightness image, a background noise image, a spreading image, and a curved image.

6. The method of claim 3, further comprising: realigning the display panel and the optical device in case that the defective image is generated by misalignment between the display panel and the optical device.

7. The method of claim 1, further comprising: compressing the first multi-view 3-dimensional image, the second multi-view 3-dimensional image, and the third multi-view 3-dimensional image such that resolutions of the first multi-view 3-dimensional image, the second multi-view 3-dimensional image, and third multi-view 3-dimensional image are resized from a first resolution to a second resolution lower than the first resolution.

8. A method of evaluating crosstalk, the method comprising:
providing, by a display panel, a first multi-view 3-dimensional image, a second multi-view 3-dimensional image, and a third multi-view 3-dimensional image to a diffuser screen;
acquiring the first multi-view 3-dimensional image, the second multi-view 3-dimensional image, and the third multi-view 3-dimensional image reflected by the diffuser screen;
receiving the first multi-view 3-dimensional image, the second multi-view 3-dimensional image, and the third multi-view 3-dimensional image;
extracting a grayscale of the first multi-view 3-dimensional image;
performing a deep learning on a crosstalk evaluation for classifying the first multi-view 3-dimensional image into a normal image or a defective image to generate a learning model; and
inputting the third multi-view 3-dimensional image different from the first multi-view 3-dimensional image into the learning model to perform the crosstalk evaluation of the third multi-view 3-dimensional image.

9. The method of claim 8, further comprising: inputting the second multi-view 3-dimensional image different from the first multi-view 3-dimensional image and the third multi-view 3-dimensional image into the learning model to verify the learning model.

10. The method of claim 8, wherein the first multi-view 3-dimensional image, the second multi-view 3-dimensional image, and the third multi-view 3-dimensional image provided by the display panel are controlled by an optical device, and the optical device is a lenticular lens or a parallax barrier.

11. The method of claim 10, wherein the defective image is generated by misalignment between the display panel and the optical device.

12. The method of claim 8, wherein the defective image includes at least one of a low brightness image, a background noise image, a spreading image, and a curved image.

13. The method of claim 10, further comprising: realigning the display panel and the optical device in case that the defective image is generated by misalignment between the display panel and the optical device.

14. The method of claim 8, further comprising: compressing the first multi-view 3-dimensional image, the second multi-view 3-dimensional image, and the third multi-view 3-dimensional image such that resolutions of the first multi-view 3-dimensional image, the second multi-view 3-dimensional image and the third multi-view 3-dimensional image are resized from a first resolution to a second resolution lower than the first resolution.

15. A crosstalk evaluation device comprising:
a display panel;
a diffuser screen that reflects a first multi-view 3-dimensional image, a second multi-view 3-dimensional image, and a third multi-view 3-dimensional image provided by the display panel;
a digital camera that acquires the first multi-view 3-dimensional image, the second multi-view 3-dimensional image, and the third multi-view 3-dimensional image reflected by the diffuser screen; and
a crosstalk evaluator that receives the first multi-view 3-dimensional image, the second multi-view 3-dimensional image, and the third multi-view 3-dimensional image, performs a deep learning on a crosstalk evaluation for classifying the first multi-view 3-dimensional image into a normal image or a defective image to generate a learning model, and inputs the third multi-view 3-dimensional image different from the first multi-view 3-dimensional image into the learning model to perform the crosstalk evaluation of the third multi-view 3-dimensional image.

16. The crosstalk evaluation device of claim 15, wherein the first multi-view 3-dimensional image, the second multi-view 3-dimensional image, and the third multi-view 3-dimensional image provided by the display panel are controlled by an optical device, and the optical device is a lenticular lens or a parallax barrier.

17. The crosstalk evaluation device of claim 16, wherein the defective image is generated by misalignment between the display panel and the optical device.

18. The crosstalk evaluation device of claim 15, wherein the defective image includes at least one of a low brightness image, a background noise image, a spreading image, and a curved image.

* * * * *